United States Patent
Hirota et al.

(10) Patent No.: US 9,165,370 B2
(45) Date of Patent: Oct. 20, 2015

(54) IMAGE PROCESSING APPARATUS, IMAGE PROCESSING METHOD, AND COMPUTER-READABLE RECORDING DEVICE

(75) Inventors: Masashi Hirota, Hachioji (JP); Yamato Kanda, Hino (JP); Makoto Kitamura, Hachioji (JP); Takehiro Matsuda, Hachioji (JP); Takashi Kono, Tachikawa (JP)

(73) Assignee: OLYMPUS CORPORATION, Tokyo (JP)

(*) Notice: Subject to any disclaimer, the term of this patent is extended or adjusted under 35 U.S.C. 154(b) by 15 days.

(21) Appl. No.: 13/396,844

(22) Filed: Feb. 15, 2012

(65) Prior Publication Data
US 2012/0237122 A1 Sep. 20, 2012

(30) Foreign Application Priority Data
Mar. 16, 2011 (JP) .................... 2011-058577

(51) Int. Cl.
 *G06K 9/00* (2006.01)
 *G06K 9/34* (2006.01)
 *G06T 7/00* (2006.01)

(52) U.S. Cl.
 CPC ............ *G06T 7/0083* (2013.01); *G06T 7/0087* (2013.01); *G06T 2207/10068* (2013.01); *G06T 2207/20076* (2013.01); *G06T 2207/20081* (2013.01)

(58) Field of Classification Search
 CPC ............... G06F 19/345; G06F 3/0317; G06T 2207/20144; G06T 7/0012; G06T 7/0083; G06T 7/208
 See application file for complete search history.

(56) References Cited

U.S. PATENT DOCUMENTS 6,434,261 B1 * 8/2002 Zhang et al. .................. 382/132
6,697,497 B1 * 2/2004 Jensen et al. .................. 382/100
(Continued)

FOREIGN PATENT DOCUMENTS

JP 08196520 A 8/1996
JP 2006-288878 A 10/2006
(Continued)

OTHER PUBLICATIONS

C. K. Pohl, et al, Multi-Level Local Feature Classification for Bleeding Detection in Wireless Capsule Endoscopy Images, 2010 IEEE Conference on Cybernetics and Intelligent Systems (CIS), p. 76-81, Jun. 28-30, 2010.*

L. Cui, et al, Bleeding Detection in Wireless Capsule Endoscopy Images by Support Vector Classifier, 2010 IEEE International Conference on Information and Automation, p. 1746-1751, Jun. 20-23, 2010.*

(Continued)

*Primary Examiner* — Vu Le
*Assistant Examiner* — Guillermo Rivera-Martinez
(74) *Attorney, Agent, or Firm* — Scully, Scott, Murphy & Presser, P.C.

(57) ABSTRACT

An image processing apparatus includes a probability value calculator that calculates, based on color feature data of a pixel included in an image, respective probabilities that the pixel belongs to a specific area and a non-specific area; a weighted edge intensity calculator that calculates a weighted edge intensity between neighboring pixels based on pixel values and color feature data of the pixel included in the image and a neighboring pixel of the pixel; an energy function creator that uses the probabilities and the weighted edge intensity to create an energy function expressed by a result of an area determination of the pixel; and an area divider that divides the image into the plurality of areas based on the energy function.

17 Claims, 12 Drawing Sheets

(56) References Cited

U.S. PATENT DOCUMENTS

| | | | |
|---|---|---|---|
| 7,577,283 B2 * | 8/2009 | Zinaty et al. | 382/128 |
| 7,630,530 B2 * | 12/2009 | McGraw et al. | 382/128 |
| 7,646,904 B2 * | 1/2010 | Summers et al. | 382/128 |
| 8,331,669 B2 * | 12/2012 | Artan et al. | 382/173 |
| 8,620,077 B1 * | 12/2013 | Grundmann et al. | 382/173 |
| 2008/0118136 A1 * | 5/2008 | Cai et al. | 382/131 |
| 2008/0281154 A1 * | 11/2008 | Gono et al. | 600/109 |
| 2010/0046816 A1 * | 2/2010 | Igual-Munoz et al. | 382/128 |

FOREIGN PATENT DOCUMENTS

| | | | |
|---|---|---|---|
| JP | 2006-288879 A | | 10/2006 |
| JP | 2007-172224 | | 7/2007 |
| JP | 2007172224 A | * | 7/2007 |
| JP | 2008-093172 A | | 4/2008 |
| JP | 2010-115413 A | | 5/2010 |

OTHER PUBLICATIONS

JP 2007172224 A, machine English translation. Reference furnished through IDS.*

Boykov et al., Fast Approximate Energy Minimization via Graph Cuts, Nov. 2001, IEEE Transactions on Pattern Analysis and Machine Intelligence, vol. 23, No. 11, pp. 1212-1239.*

Boykov et al., An Experimental Comparison of Min-Cut/Max-Flow Algorithms for Energy Minimization in Vision, Sep. 2004, IEEE Transactions on PAMI, vol. 26, No. 9, pp. 1124-1137.*

Japanese Notice of Rejection dated Dec. 2, 2014 issued in corresponding Japanese Patent Application No. 2011-058577.

Boykov, Y. et al., "Interactive Graph Cuts for Optimal Boundary & Region Segmentation of Objects in N-D Images", Proceeding of "International Conference on Computer Vision" (Jul. 2001), Vancouver, Canada, vol. 1, pp. 105-112.

* cited by examiner

IMAGE PROCESSING APPARATUS, IMAGE PROCESSING METHOD, AND COMPUTER-READABLE RECORDING DEVICE

CROSS-REFERENCE TO RELATED APPLICATIONS

This application is based upon and claims the benefit of priority from Japanese Patent Application No. 2011-058577, filed on Mar. 16, 2011, the entire contents of which are incorporated herein by reference.

BACKGROUND OF THE INVENTION

1. Field of the Invention

The present invention relates to an image processing apparatus which divides an image into a plurality of areas, an image processing method, and a computer-readable recording device.

2. Description of the Related Art

Conventionally, an endoscope has been widely used as a medical observation device which is inserted to an inside of a body of a subject such as a patient and allows non-invasive observation of an inside of a lumen. In recent years, a swallowable endoscope (capsule endoscope) which houses an imaging device, a communication device, and the like in an inside of a capsule-shaped casing and wirelessly transmits image data captured by the imaging device to an outside of the body has also been used.

An observation of and a diagnosis on the images obtained by the medical observation device are difficult tasks requiring a lot of experiences and efforts. Especially, since the number of successive images (intraluminal images) obtained in one examination becomes huge (not less than several tens of thousands of images) in the case of a capsule endoscope, a burden imposed on a doctor who makes a diagnosis is heavy. Therefore, medical diagnosis supporting functions which assist a diagnosis by a doctor have been desired. As one of such functions, an image recognition technique in which an abnormal site and the like are automatically detected from intraluminal images and an image which needs to be intensively diagnosed is indicated has been proposed.

By the way, it is of significance, as a preprocessing in detecting an abnormal site and the like by the image recognition, to eliminate an area which captures a residue and the like and is unnecessary for the observation and to extract a mucus membrane area. As a technique concerning an area division (segmentation) of an image, a method of extracting a segment having a predetermined feature based on color information and edge information in each of pixels constituting an image is disclosed in Japanese Patent Application Laid-Open No. 2007-172224, for example. More specifically, a predetermined segment is extracted by obtaining an energy function based on a probability indicating that pixel data shows a color in a predetermined segment and based on a relation between pixel data of pixels adjacent to each other (whether or not an edge is present between neighboring pixels) and minimizing the energy function in Japanese Patent Application Laid-Open No. 2007-172224.

SUMMARY OF THE INVENTION

According to an aspect of the present invention, an image processing apparatus which divides an image into a plurality of areas, includes: a probability value calculator that calculates, based on color feature data of a pixel included in the image, respective probabilities that the pixel belongs to the plurality of areas; a weighted edge intensity calculator that calculates a weighted edge intensity between neighboring pixels based on pixel values and color feature data of the pixel included in the image and a neighboring pixel of the pixel; an energy function creator that uses the probabilities and the weighted edge intensity to create an energy function whose variable is a result of an area determination of the pixel; and an area divider that divides the image into the plurality of areas based on the energy function.

According to another aspect of the present invention, an image processing method performed by an image processing apparatus which divides an image into a plurality of areas, includes: calculating, based on color feature data of a pixel included in the image, respective probabilities that the pixel belongs to the plurality of areas; calculating a weighted edge intensity between neighboring pixels based on pixel values and color feature data of the pixel included in the image and a neighboring pixel of the pixel; creating an energy function whose variable is a result of an area determination of the pixel by using the probabilities and the weighted edge intensity; and dividing the image into the plurality of areas based on the energy function.

According to still another aspect of the present invention, in a computer-readable recording device in which an executable program is recorded, the program instructs a processor for dividing an image into a plurality of areas to execute: calculating, based on color feature data of a pixel included in the image, respective probabilities that the pixel belongs to the plurality of areas; calculating a weighted edge intensity between neighboring pixels based on pixel values and color feature data of the pixel included in the image and a neighboring pixel of the pixel; creating an energy function whose variable is a result of an area determination of the pixel by using the probabilities and the weighted edge intensity; and dividing the image into the plurality of areas based on the energy function.

The above and other features, advantages, and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image processing apparatus, an image processing method, and a computer-readable recording device according to the present invention will be explained below with reference to the accompanying drawings. It should be noted that the present invention is not limited to the embodiments. The same part is assigned with the same reference symbol in the description of the drawings.

An image processing apparatus according to the embodiments to be explained below performs a processing of dividing, into a specific area and a non-specific area, an intraluminal image capturing an inside of a subject (inside of a lumen) by a medical observation device such as an endoscope and a capsule endoscope, for example. Specifically, a mucus membrane area which is an observation target in a medical diagnosis is processed as the specific area and a residue area which is not treated as an observation target is processed as the non-specific area. The residue area means an area capturing, by having an overlap with a mucus membrane (more specifically on a near side from the mucus membrane) in a screen of the intraluminal image, a residue attaching on the mucus membrane or a residue floating away from the mucus membrane.

The intraluminal image to which an image processing is performed in the embodiments below is, for example, a color image having a pixel level (pixel value) for each of color components red (R), green (G), and blue (B) in each pixel.

First Embodiment

Figure 1:
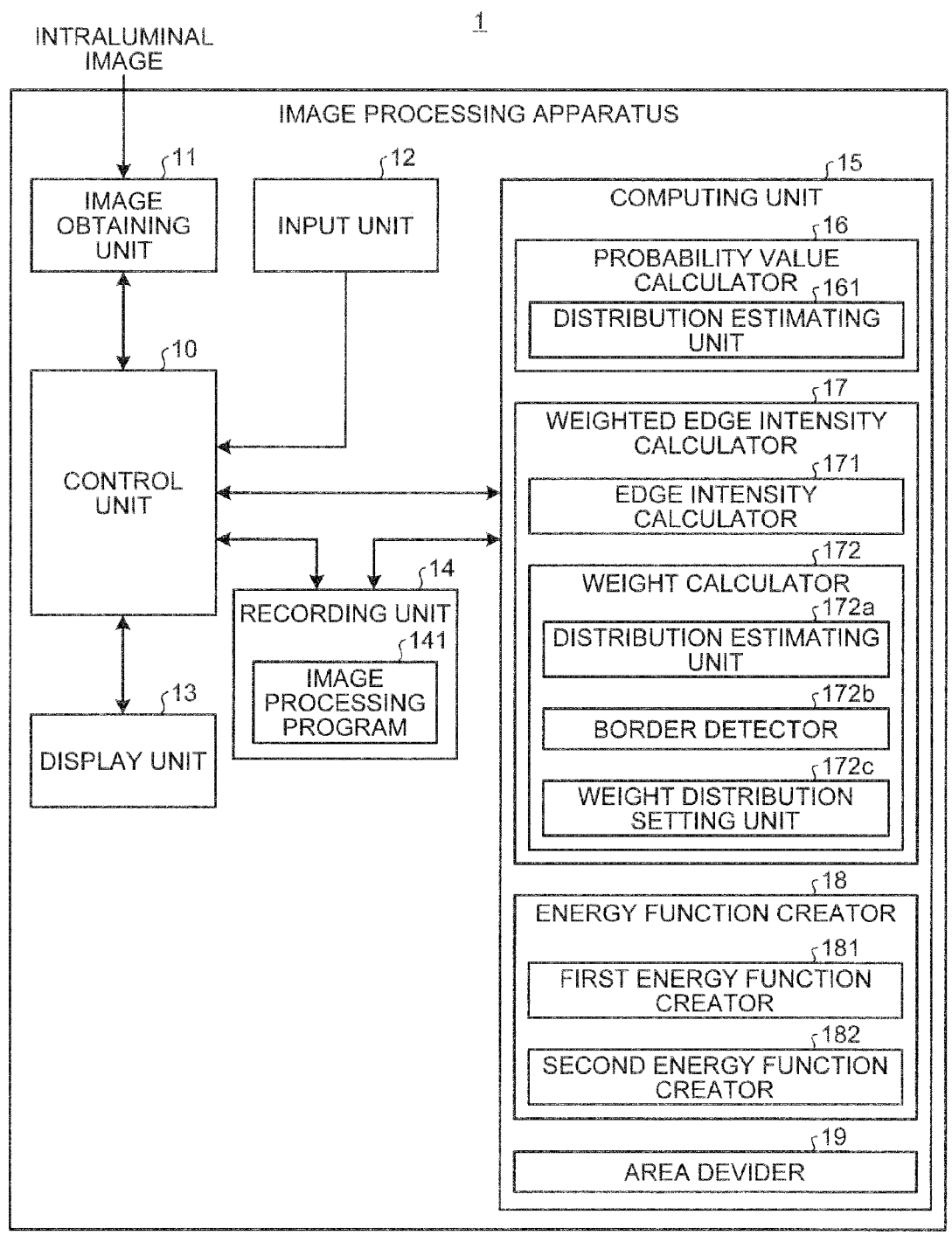
FIG. 1 is a block diagram of a configuration of an image processing apparatus according to a first embodiment of the present invention.

FIG. 1 is a block diagram of a configuration of an image processing apparatus according to a first embodiment of the present invention. As shown in FIG. 1, an image processing apparatus 1 is provided with a control unit 10 that controls operations of an entirety of the image processing apparatus 1, an image obtaining unit 11 that obtains image data of intraluminal images captured by a medical observation device, an input unit 12 that receives a signal input from an outside, a display unit 13 that displays a view including intraluminal images and information of various kinds, a recording unit 14, and a computing unit 15 that performs a computing processing in which a division into a residue area and a mucus membrane area is performed.

The control unit 10 is realized by a hardware such as a CPU; reads programs of various kinds stored in the recording unit 14 to instruct units constituting the image processing apparatus 1, transmit data, and the like in accordance with image data input from the image obtaining unit 11, an operation signal input through the input unit 12, and the like; and overall controls entire operations of the image processing apparatus 1.

The image obtaining unit 11 is arbitrarily configured depending on a mode of a system including a medical observation device. For example, in a case where the medical observation device is a capsule endoscope and a portable recording medium is used for receiving and passing image data with the medical observation device, the image obtaining unit 11 is configured by a reader to which the recording medium is detachably attached and which reads out image data of the stored intraluminal images. Besides, in a case of arranging a server which stores the image data of the intraluminal images captured by the medical observation device, the image obtaining unit 11 is configured by a communication device and the like to be connected to the server and obtains the image data of the intraluminal images via data communication with the server. Alternatively, the image obtaining unit 11 may be configured by an interface arrangement and the like through which an image signal is input from the medical observation device such as an endoscope via a cable.

The input unit 12 is, for example, realized by a keyset, a mouse, a touchscreen, switches of various kinds, and the like and outputs an input signal having received from the outside to the control unit 10.

The display unit 13 is realized by a display device such as an LCD and an EL display.

The recording unit 14 is realized by IC memories of various kinds including a ROM and a RAM such as a flash memory in which editing and recording functions are allowed, an internal or external hard disk, an information recording device such as a CD-ROM and the information-recording-device-dedicated reader in combination, and the like. The recording unit 14 stores programs which enable the image processing apparatus 1 to operate and to execute various functions, data to be used while the programs are executed, and the like in addition to the image data of the intraluminal images obtained by the image obtaining unit 11. For example, the recording unit 14 stores an image processing program 141 which enables an area division into a residue area and a mucus membrane area.

The computing unit 15 is realized by a hardware such as a CPU and reads the image processing program 141 to perform various computing processing for the division done by processing the image data of the intraluminal images and identifying the residue area and the mucus membrane area. The computing unit 15 is provided with a probability value calculator 16, a weighted edge intensity calculator 17, an energy function creator 18, and an area divider 19.

The probability value calculator 16 calculates, based on color feature data of each of the pixels included in an intraluminal image, a probability that each pixel belongs to a residue area and a probability that each pixel belongs to a mucus membrane area in the image. More specifically, the probability value calculator 16 is provided with a distribution estimating unit 161 that estimates a distribution of color feature data of a pixel belonging to the residue area and a distribution of color feature data of a pixel belonging to the mucus membrane area based on the color feature data of the pixel, and calculates respective probabilities that each pixel belongs to the residue area and the mucus membrane area based on the estimated two distributions (frequencies) of the color feature data.

The weighted edge intensity calculator 17 calculates a weighted edge intensity between pixels adjacent to each other based on pixel values and color feature data of a pixel included in an intraluminal image and of another pixel adjacent to the pixel (neighboring pixel). More specifically, the weighted edge intensity calculator 17 is provided with an edge intensity calculator 171 that calculates an edge intensity based on pixel values of the pixel included in the intraluminal image and of the neighboring pixel and a weight calculator 172 that calculates a weight to be given to the calculated edge intensity based on the color feature data of the pixel included in the intraluminal image and of the neighboring pixel. The weight calculator 172 includes a distribution estimating unit 172a that estimates a distribution of color feature data of a pixel belonging to the residue area and a distribution of color feature data of a pixel belonging to the mucus membrane area based on the color feature data of the pixel included in the intraluminal image; a border detector 172b that detects a border between the color feature data distribution of the residue area and the color feature data distribution of the mucus membrane area; and a weight distribution setting unit 172c that sets a weight distribution which allows a value for weight to become maximum at the border of the distributions, and sets a function corresponding to the set weight distribution as a weight function.

The energy function creator 18 uses the respective probabilities that each pixel in an intraluminal image 100 belongs to the residue area and the mucus membrane area and the weighted edge intensity between each pixel and its neighboring pixel to create an energy function expressed by a result of a determination on which area each pixel belongs to. More specifically, the energy function creator 18 is provided with a first energy function creator 181 that creates a first energy function based on the probabilities calculated for each pixel and a second energy function creator 182 that creates a second energy function based on the weighted edge intensity between neighboring pixels, and sets a sum of the first and the second energy functions as an energy function.

The area divider 19 calculates an area determination result which minimizes the energy function and divides the intraluminal image into the residue area and the mucus membrane area.

Figure 2:
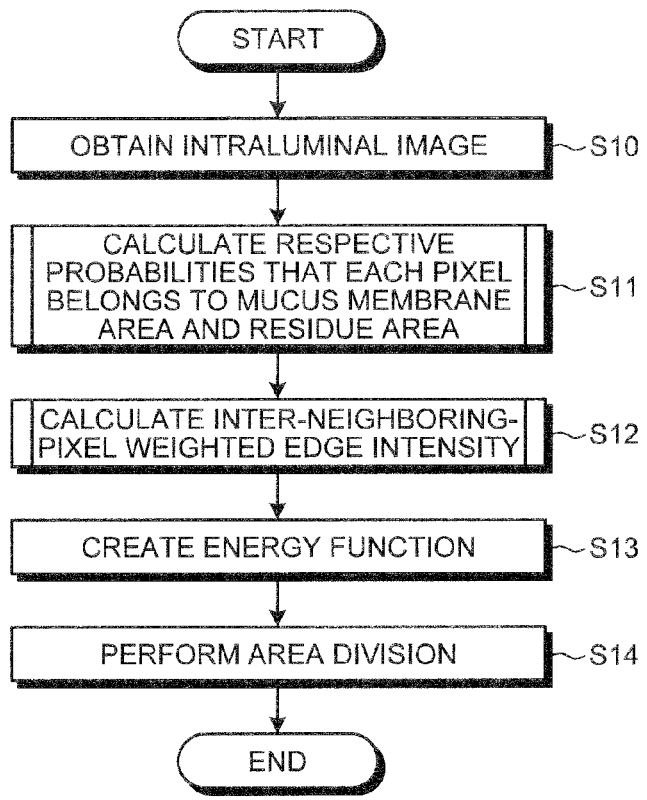
FIG. 2 is a flowchart of an operation of the image processing apparatus shown in FIG. 1.
Figure 3:
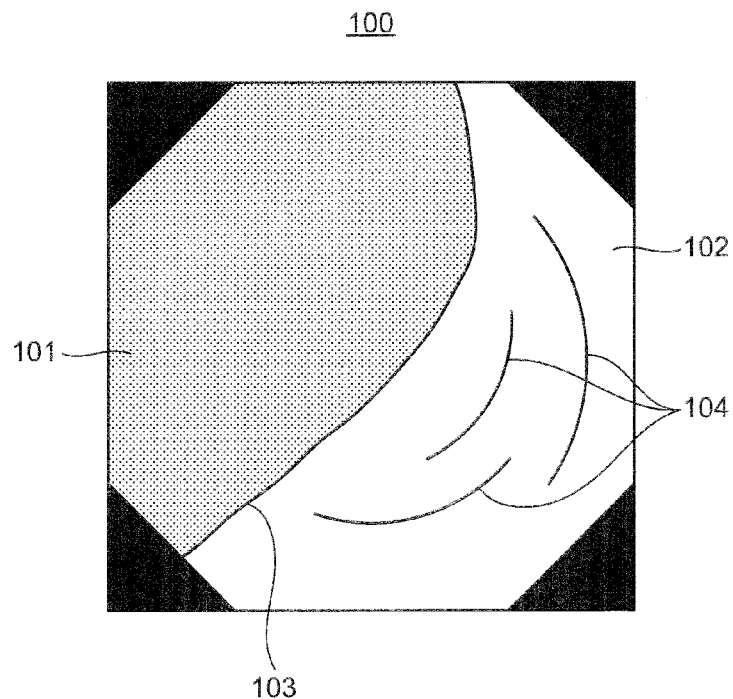
FIG. 3 schematically shows an example of an intraluminal image as an image processing target.

Next, an operation of the image processing apparatus 1 will be explained with reference to FIGS. 2 and 3. FIG. 2 is a flowchart of an operation of the image processing apparatus 1. FIG. 3 schematically shows an example of an intraluminal image captured by a capsule endoscope and processed by the image processing apparatus 1.

First at step S10, the computing unit 15 obtains the intraluminal image 100 as a processing target from the recording unit 14. In the explanation below, a processing on the intraluminal image 100 shown in FIG. 3 will be taken as an example. The intraluminal image 100 includes a residue area 101 and a mucus membrane area 102. Since four corners of the intraluminal image 100 do not have effectual information about a subject, a masking treatment is applied in advance.

At step S11, the probability value calculator 16 calculates respective probabilities that each pixel in the intraluminal image 100 belongs the residue area and the mucus membrane area based on color feature data of the pixel included in the intraluminal image 100. In the first embodiment, a hue value is used as the color feature data.

Figure 4:
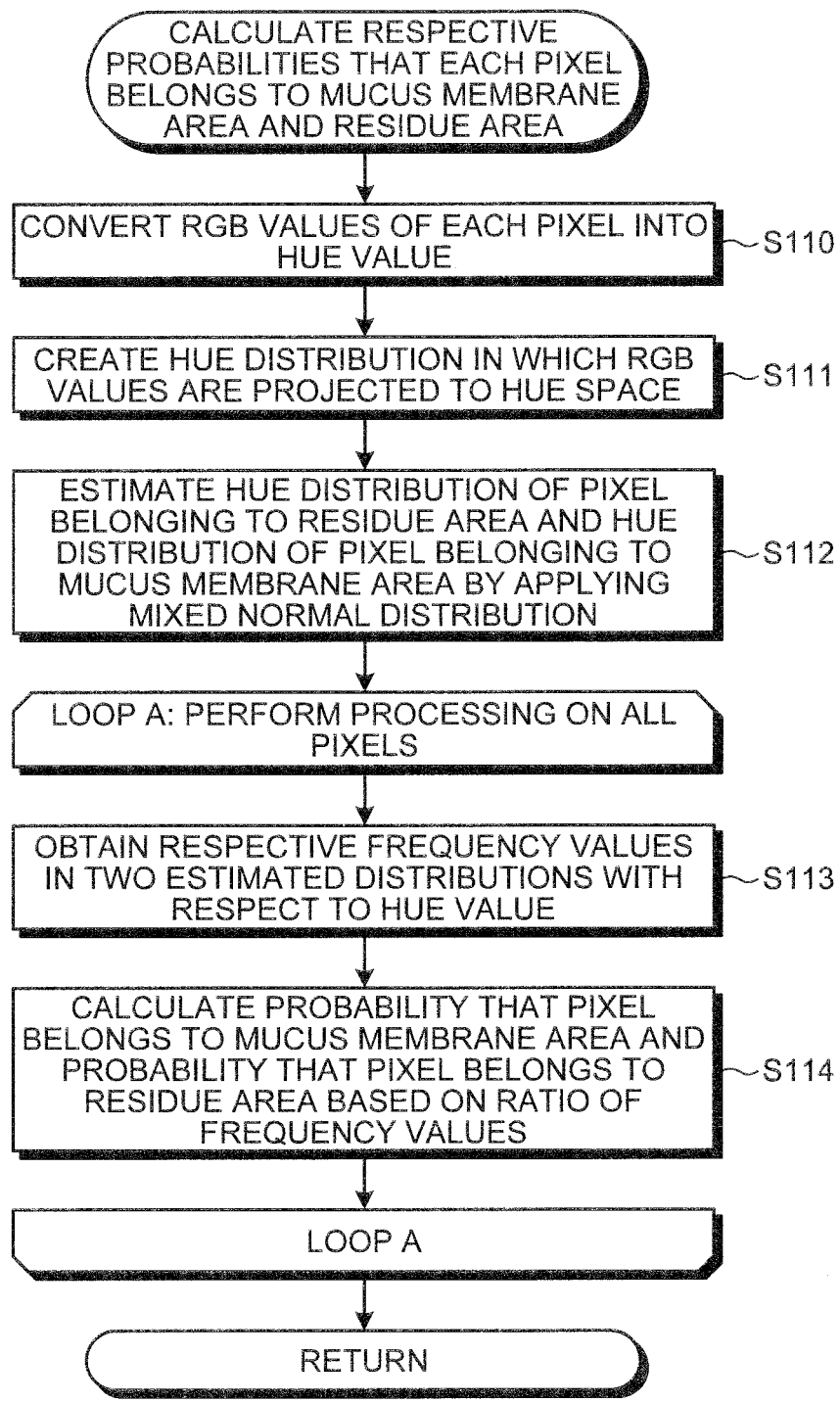
FIG. 4 is a flowchart of an operation of a probability value calculator.

FIG. 4 is a flowchart of a detailed operation of the probability value calculator 16 at step S11.

At step S110, the probability value calculator 16 converts RGB values of each pixel in the intraluminal image 100 into a hue value. As a method for the conversion into the hue value, it is only necessary to use a known conversion equation in an HSI conversion (reference: *Digital image processing*, pp. 64-67, COMPUTER GRAPHIC ARTS SOCIETY).

Figure 5A:
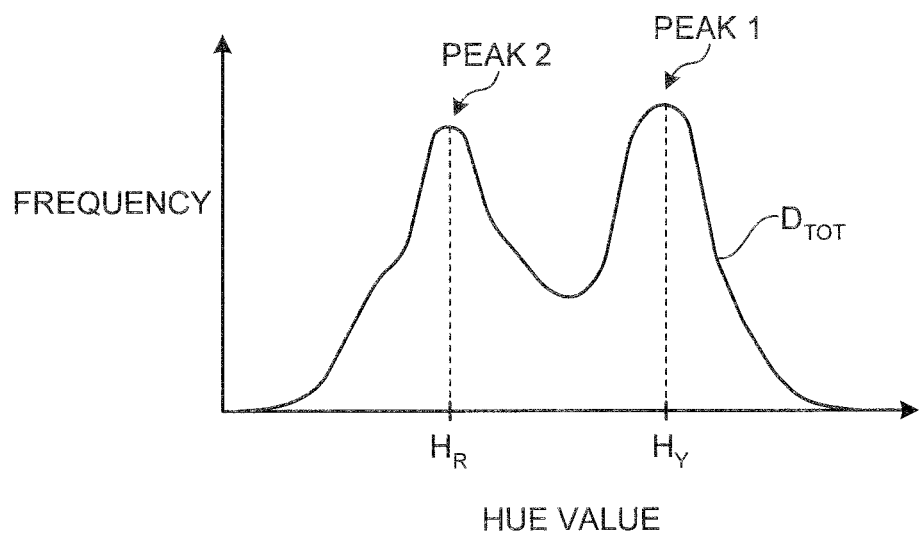
FIG. 5A is a histogram of a hue distribution.

At a subsequent step S111, the probability value calculator 16 creates a hue distribution in which RGB values are projected to a feature space (a hue space) formed by a single axis for hue based on the hue value of each pixel. FIG. 5A is a histogram of a hue distribution created in this manner. Here, since a residue mainly presents a yellow color and a mucus membrane mainly presents a red color normally, there is a strong possibility that a hue distribution $D_{TOT}$ represents a diphasic form having two peaks (peak 1 and peak 2) respectively corresponding to a residue's center hue $H_Y$ and a mucus membrane's center hue $H_R$ when both the residue area 101 and the mucus membrane area 102 are present in the intraluminal image 100.

At step S112, the distribution estimating unit 161 estimates a hue distribution of a pixel belonging to the residue area 101 and a hue distribution of a pixel belonging to the mucus membrane area 102 by applying a mixed normal distribution formed of two normal distributions to the hue distribution $D_{TOT}$. The mixed normal distribution can be obtained by using a known method such as an expectation-maximization (EM) algorithm, for example. The EM algorithm is a computing method of estimating parameters by calculating an expectation of a likelihood of a model based on certain parameters and calculating parameters maximizing the calculated expectation repetitively.

Figure 5B:
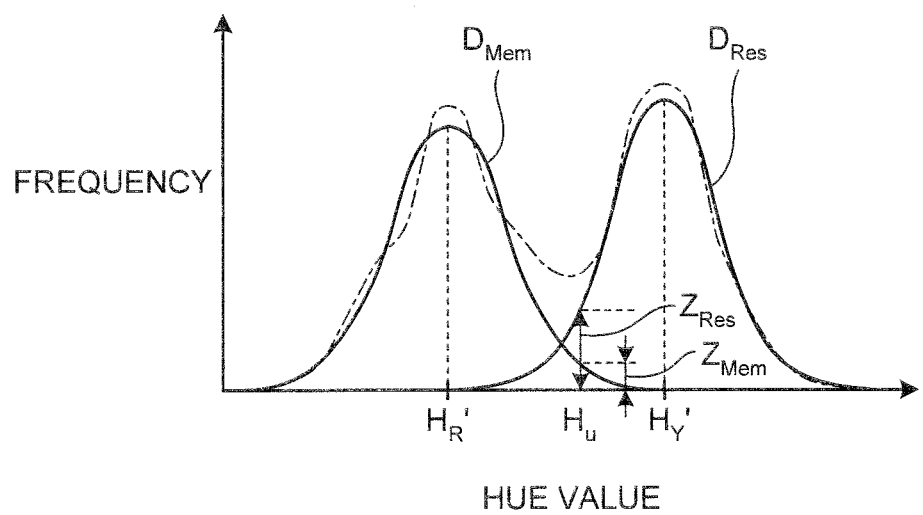
FIG. 5B shows a hue distribution of a mucus membrane area and a residue area.

FIG. 5B shows hue distributions of the respective areas estimated with respect to the hue distribution $D_{TOT}$ (the distributions being hereinafter referred to as "estimated distributions". In FIG. 5B, an estimated distribution $D_{Res}$ whose average is a hue value $H_Y'$ ($H_Y' \approx H_Y$) is a hue distribution of a pixel which is estimated to belong to the residue area 101. On the other hand, an estimated distribution $D_{Mem}$ whose average is a hue value $H_R'$ ($H_R' \approx H_R$) is a hue distribution of a pixel which is estimated to belong to the mucus membrane area 102. The distribution estimating unit 161 records the estimated distributions $D_{Res}$ and $D_{Mem}$ in the recording unit 14.

The probability value calculator 16 then executes a processing of a loop A on each pixel included in the intraluminal image 100. First at step S113, the probability value calculator 16 obtains frequency values in the two estimated distributions $D_{Res}$ and $D_{Mem}$ with respect to the hue value of each pixel. At subsequent step S114, the probability value calculator 16 calculates a probability that the pixel belongs to the residue area 101 and a probability that the pixel belongs to the mucus membrane area 102 based on a ratio of the obtained frequency values.

In a case of a pixel u having a hue value $H_u$ ("u" being an index which discerns each pixel), for example, a frequency value in the estimated distribution $D_{Res}$ is $Z_{Res}$ and a frequency value in the estimated distribution $D_{Mem}$ is $Z_{Mem}$. Based on this, a probability $P_u(\text{Res})$ that the pixel u belongs to the residue area 101 and a probability $P_u(\text{Mem})$ that the pixel u belongs to the mucus membrane area 102 are provided by following equations (1) and (2), respectively.

$$P_u(\text{Res}) = Z_{Res}/(Z_{Mem} + Z_{Res}) \quad (1)$$

$$P_u(\text{Mem}) = Z_{Mem}/(Z_{Mem} + Z_{Res}) \quad (2)$$

After the probability value calculator 16 executes the processing of the loop A on all the pixels in the intraluminal image 100, the operation returns to the main routine.

At step S12 in FIG. 2, the weighted edge intensity calculator 17 calculates a weighted edge intensity between pixels adjacent to each other (between neighboring pixels) based on the pixel values and the color feature data of each pixel in the intraluminal image 100.

Here, the reason why the edge intensity between neighboring pixels is provided with a weight is as follows. Specifically, in the case of calculating an edge intensity by a general Sobel filter and the like, an edge of a groove 104 in the mucus membrane and the like is detected with high intensity other than the border (hereinafter referred to as a "residue border") 103 between the residue area 101 and the mucus membrane area 102. Therefore, the edge intensity of the residue border 103 becomes low relatively, which causes a failure in detecting the residue border 103 appropriately. To solve this problem in the first embodiment, an edge indicating the residue border 103 is configured to have a higher intensity value to be emphasized more than other edges by focusing an attention on a difference in color between the residue area 101 and the mucus membrane area 102 and giving a weight to an edge intensity based on color feature data (hue in the first embodiment).

Figure 6:
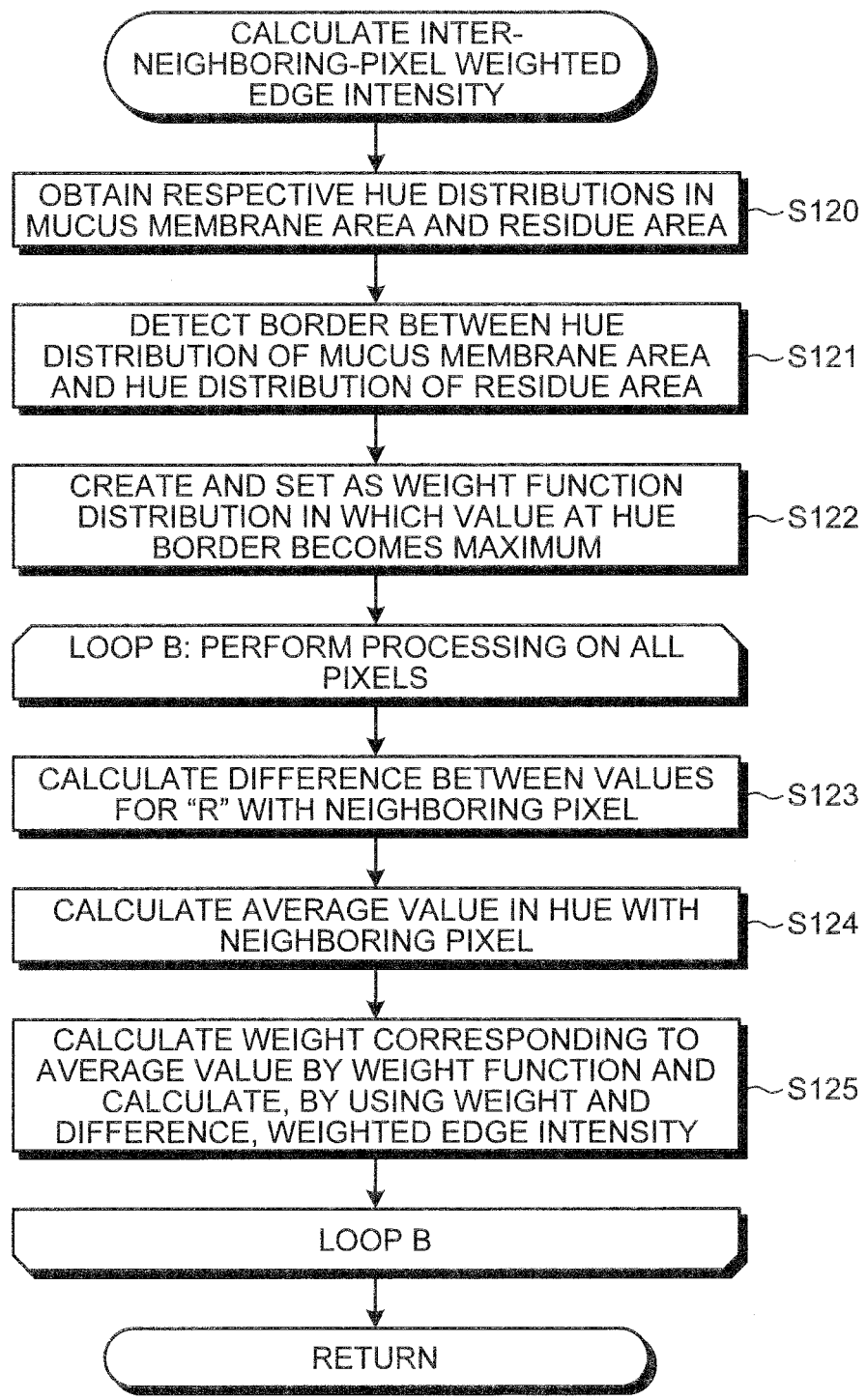
FIG. 6 is a flowchart of an operation of a weighted edge intensity calculator.

FIG. 6 is a flowchart of a detailed operation of the weighted edge intensity calculator 17 at step S12.

At step S120, the distribution estimating unit 172*a* obtains a hue distribution of a pixel estimated to be included in the residue area 101 and a hue distribution of a pixel estimated to be included in the mucus membrane area 102 based on the hue value of the pixel in the intraluminal image 100. Since the estimating processing has already been performed by the probability value calculator 16 in the first embodiment, the distribution estimating unit 172*a* obtains the estimated hue distributions (specifically, the estimated distributions $D_{Mem}$ and $D_{Res}$ shown in FIG. 5B) from the recording unit 14. Here, if the estimating processing has not been performed yet by the probability value calculator 16, the distribution estimating unit 172*a* may estimate respective hue distributions in the residue area 101 and the mucus membrane area 102 via the same processing as steps S110 to S112 shown in FIG. 4.

At step S121, the border detector 172*b* detects a border BOR (hereinafter referred to as a "hue border") at which the frequency value of the estimated distribution $D_{Res}$ and the frequency value of the estimated distribution $D_{Mem}$ become comparable with each other (see FIG. 7). The reason why this detection is performed is because there is a strong possibility that a hue value of the residue border 103 in an actual image space is close to a hue value $H_{BOR}$ at the hue border BOR. Here, when an image space is divided into the residue area 101 and the mucus membrane area 102 by treating the hue value $H_{BOR}$ as a threshold, a border therebetween does not necessarily accord with the actual residue border 103.

At step S122, the weight distribution setting unit 172*c* creates a weight distribution $D_W$ in which a value at the hue border BOR becomes maximum and sets a function corresponding to the weight distribution as a weight function $f_W$. The weight distribution $D_W$ may be anything as long as the distribution marks a maximum value at the hue border BOR and values (at least two values) in the distribution vary depending on a distance from the hue border BOR in the hue space. For example, the distribution may be a normal distribution whose average is the hue value $H_{BOR}$, a distribution which has a stepwise pattern and presents a maximum value at the hue border BOR, or a distribution which has a triangular shape and presents a peak at the hue border BOR, for example.

Figure 7:
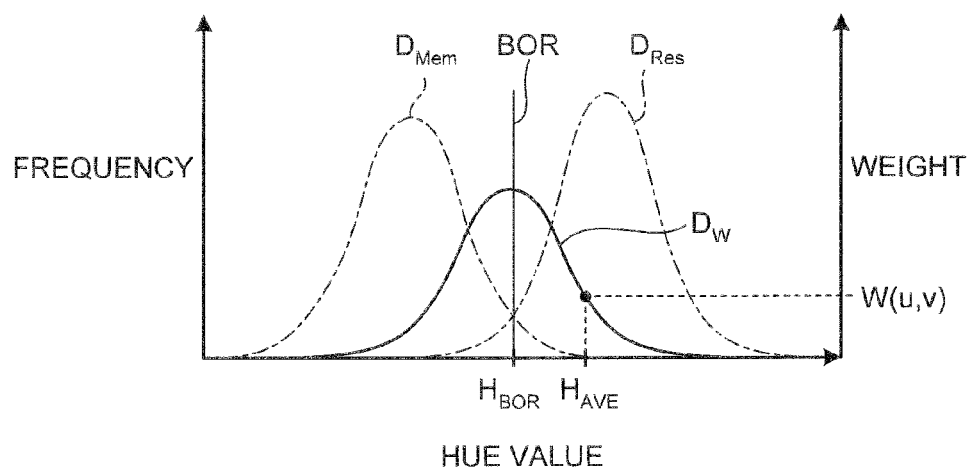
FIG. 7 shows a weight distribution created based on the hue distribution.

In the first embodiment, a normal distribution whose average is the hue value $H_{BOR}$ is created as the weight distribution $D_W$ as shown in FIG. 7. In this case, it is only necessary to calculate a dispersion in the weight distribution $D_W$ by applying an average value of the estimated distributions $D_{Res}$ and $D_{Mem}$, for example based on dispersions in the estimated distributions $D_{Res}$ and $D_{Mem}$. Alternatively, an arbitrary value may be determined in advance as a dispersion in the weight distribution $D_W$.

Besides, the weight distribution $D_W$ may have a symmetric shape or an asymmetric shape with respect to the hue border BOR. The latter case may be realized, for example, by creating a distribution which shows a normal distribution in which an average is the hue value $H_{BOR}$ and has a dispersion equal to the dispersion of the estimated distribution $D_{Res}$ at a side of the estimated distribution $D_{Res}$; and a normal distribution in which an average is the hue value $H_{BOR}$ and has a dispersion equal to the dispersion of the estimated distribution $D_{Mem}$ at a side of the estimated distribution $D_{Mem}$ across the hue border BOR.

Alternatively, the weight distribution setting unit 172*c* may create a data table in which a hue value and a weight are associated with each other instead of setting the weight function $f_W$.

The weighted edge intensity calculator 17 then executes a processing of a loop B on each pixel included in the intraluminal image 100. First at step S123, the edge intensity calculator 171 calculates a difference Diff(u, v) in a value for "R" between the pixel u and a neighboring pixel v in the intraluminal image 100 ("v" being an index which discerns the neighboring pixel). Here, the reason of calculating the difference in the value for "R" is that the value for "R" is likely to show a difference between the residue area 101 and the mucus membrane area 102 since the residue area 101 and the mucus membrane area 102 have respective absorbances different from each other with respect to a wavelength corresponding to the value for "R".

At a subsequent step S124, the edge intensity calculator 171 calculates an average value $H_{AVE}$ of a hue value $H_u$ of the pixel u and a hue value $H_v$ of the neighboring pixel v. The average value $H_{AVE}$ is obtained by equation $H_{AVE}=(H_u+H_v)/2$.

At step S125, the weight calculator 172 calculates a weight W(u, v) corresponding to the average value $H_{AVE}$ from the weight function $f_W$ and calculates a weighted edge intensity Edge(u, v) obtained by following equation (3) by using the weight W(u, v) and the difference Diff(u, v).

$$\text{Edge}(u,v)=W(u,v)\times\text{Diff}(u,v) \tag{3}$$

In the case of creating the data table at step S122, the weight calculator 172 may extract the weight W(u, v) from the data table.

After the weighted edge intensity calculator 17 executes the processing of the loop B on all the pixels in the intraluminal image 100, the operation returns to the main routine.

At step S13 in FIG. 2, the energy function creator 18 creates an energy function E(X) based on the probabilities $P_u$(Res) and $P_u$(Mem) calculated at step S11 and the weighted edge intensity Edge(u, v) calculated at step S12. Here, the energy function E(X) is a function whose variable is a class determination result X with respect to all the pixels in the intraluminal image 100. The class determination result X indicates a result of determining which each pixel belongs to, the residue area 101 or the mucus membrane area 102 and there are $2^n$ combinations when the number of pixels in the intraluminal image 100 is n.

The energy function E(X) is expressed by a sum of a first energy function E1(X) calculated based on the respective probabilities that each pixel is included in respective areas and a second energy function E2(X) calculated based on the weighted edge intensity of each pixel as shown in following equation (4).

$$E(X)=\alpha\cdot E1(X)+\beta\cdot E2(X) \tag{4}$$

In equation (4), symbols "α" and "β" are arbitrary coefficients (constants).

The first energy function E1(X) is obtained by following equation (5).

$$E1(X) = \sum_{u \in U} \{-\ln(P_u(X_u))\} \qquad (5)$$

At a right-hand side of equation (5), a symbol "$X_u$" indicates a class determination result with respect to the pixel u, a symbol "$P_u(X_u)$" indicates a probability that the pixel u belongs to a class $X_u$, and a symbol "U" indicates a set of all the pixels in the intraluminal image 100.

For example, when the pixel u is determined to belong to the residue area 101, $P_u(X_u)$ becomes equal to $P_u(\text{Res})$. In contrast, when the pixel u is determined to belong to the mucus membrane area 102, $P_u(X_u)$ becomes equal to $P_u(\text{Mem})$. Thus, a member $\{-\ln(P_u(X_u))\}$ becomes small when the pixel u is determined to belong to more probable area. Here, the more probable area means an area presenting a larger value in the probability $P_u(\text{Mem})$ or the probability $P_u(\text{Res})$. Therefore, the larger the number of pixels belonging to more probable area is, the smaller a total value in the first energy function E1(X) becomes.

On the other hand, the second energy function E2(X) is obtained by following equation (6).

$$E2(X) = \sum_{(u,v) \in D} \delta(X_u, X_v) \cdot \exp\{-\text{Edge}(u, v)\} \qquad (6)$$

At a right-hand side of equation (6), a symbol "D" indicates a combination of all neighboring pixels (u, v). Besides, a symbol "$\delta(X_u, X_v)$" represents a function showing a combination of a determination result in neighboring pixels and is obtained by following equation (7).

$$\delta(X_u, X_v) = \begin{cases} 0 & X_u = X_v \\ 1 & X_u \neq X_v \end{cases} \qquad (7)$$

A value for a member "$\exp\{-\text{Edge}(u, v)\}$" at a right-hand side of equation (6) becomes smaller as a value for the weighted edge intensity Edge(u, v) between neighboring pixels is larger. Therefore, the larger the difference Diff(u, v) between the neighboring pixels in which the residue border 103 is determined to be present or the closer to the hue border BOR the neighboring pixels (u, v) in which the residue border 103 is determined to be present are, the smaller a total value in the second energy function E2(X) becomes.

Figure 9:
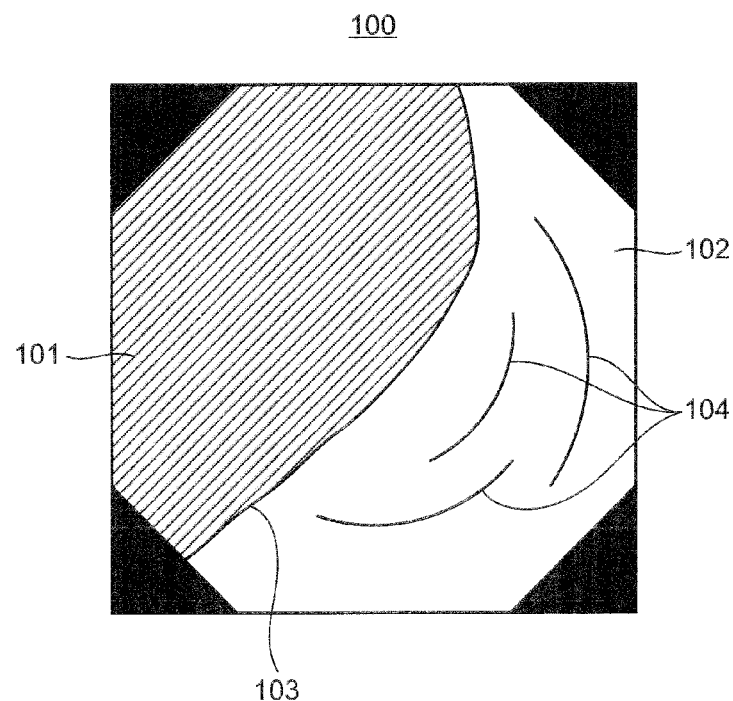
FIG. 9 schematically shows an intraluminal image from which a residue area is eliminated.

At step S14, the area divider 19 obtains the class determination result X which enables optimizing (minimizing) the energy function E(X) and divides the intraluminal image 100 based on the class determination result X. By this division, the intraluminal image 100 from which the residue area 101 is eliminated can be obtained as shown in FIG. 9, for example.

As a solution for the problem of optimizing the energy function, various methods such as an active contour model including snakes method and level set method and graph cut method are known. In the first embodiment, a solution based on the graph cut method will be taken as an example and explained (reference: Y. Boykov, M. Jolly, "Interactive Graph Cuts for Optimal Boundary & Region Segmentation of Objects in N-D Images", Proceeding of "International Conference on Computer Vision", July 2001, vol. 1, pp. 105-112).

Figure 8A:
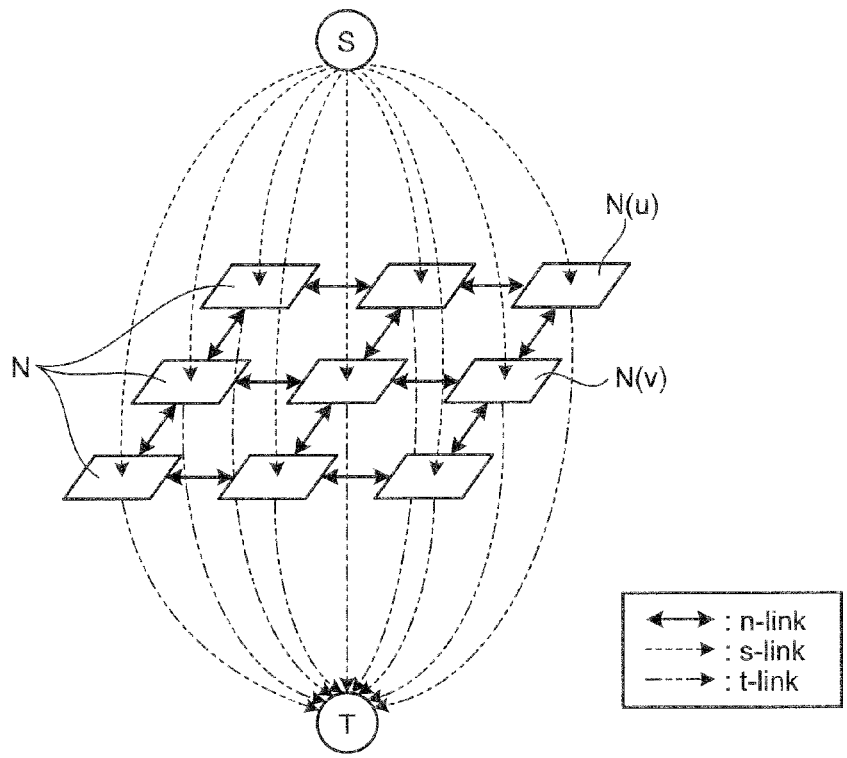
FIG. 8A shows a directed graph in a graph cut approach.

In the graph cut method, first created is a directed graph which is constituted by a node N corresponding to each pixel in the intraluminal image 100; nodes S and T respectively corresponding to the classes to which each pixel can belong (i.e., the residue area 101 and the mucus membrane area 102 as the determination result); an n-link which connects neighboring nodes N, for example, a node N(u) and a node N(v) (each of u and v being an index which discerns each pixel); an s-link which connects the node N and the node S; and a t-link which connects the node N and the node T as shown in FIG. 8A. In the first embodiment, the node S and the node T are set as the residue area and the mucus membrane area, respectively.

Figure 8B:
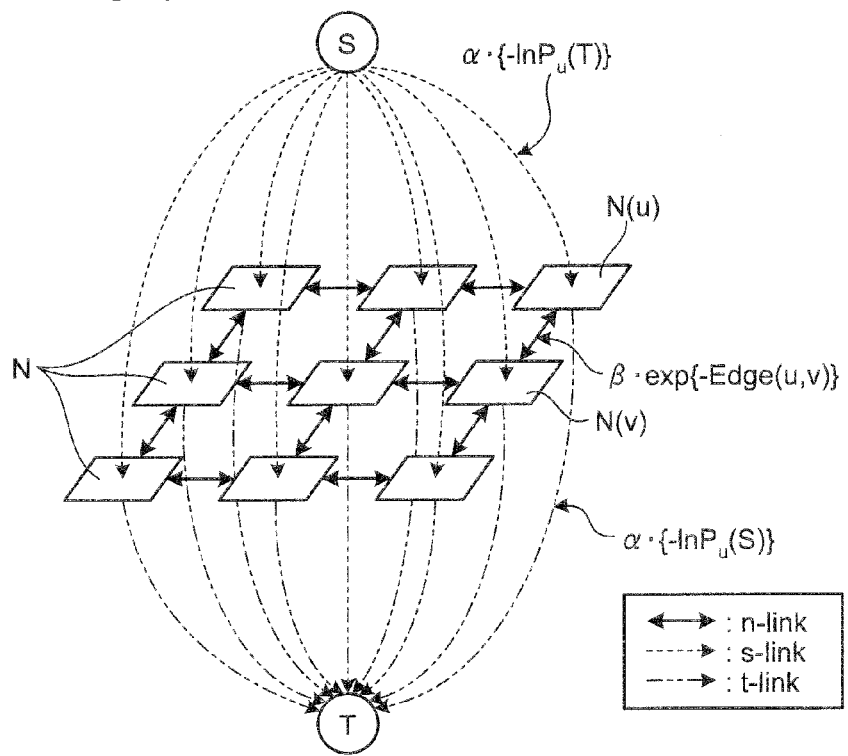
FIG. 8B is a view explaining a cost to be given to each node.

Next, a cost based on the probabilities calculated at step S1 and the weighted edge intensity calculated at step S12 is provided to each link. Specifically, a cost $\beta \cdot \exp\{-\text{Edge}(u, v)\}$ based on the inter-neighboring-pixel weighted edge intensity Edge(u, v) is provided to the n-link as shown in FIG. 8B. A cost $\alpha \cdot \{-\ln(P_u(T))\}$ based on the probability $P_u(T)(=P_u(\text{Mem}))$ that the pixel u belongs to the mucus membrane area 102 is provided to the s-link. A cost $\alpha \cdot \{-\ln(P_u(S))\}$ based on the probability $P_u(S)(=P_u(\text{Res}))$ that the pixel u belongs to the residue area 101 is provided to the t-link.

Figure 8C:
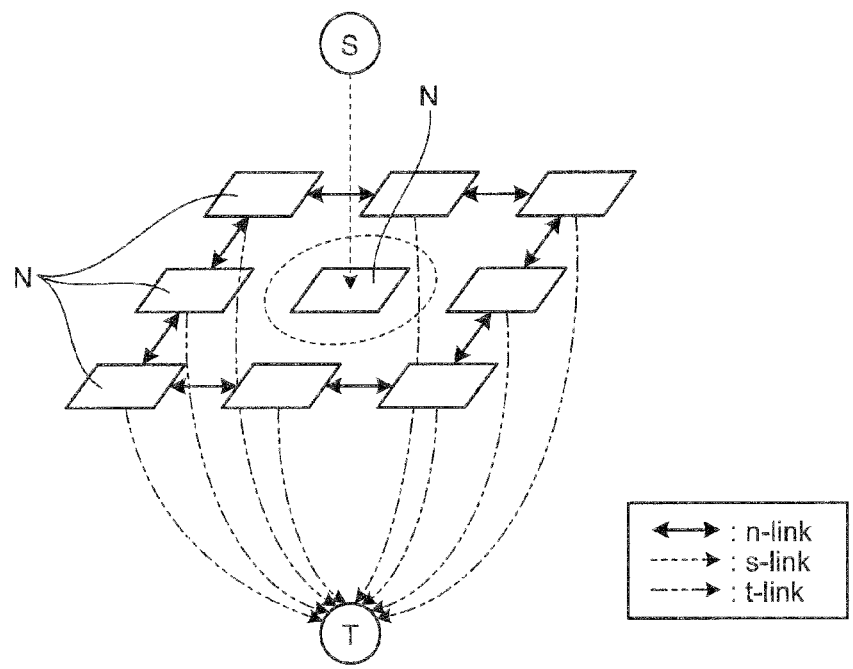
FIG. 8C shows a state where the directed graph is divided into two sets.

Next, the directed graph is divided into two sets, one of which includes the node S and the other of which includes the node T. On this occasion, the division processing is performed so that a summation of costs provided to the cut links becomes minimum. This represents searching a route in which a flow from the node S to the node T becomes maximum and cutting a link whose redundant capacity in route is run out (minimum cost and maximum flow algorithm). By this, a set of node N connected to the node S and a set of node N connected to the node T are obtained as shown in FIG. 8C, for example.

The summation of the costs provided to the links cut in this manner corresponds to a value of the energy function E(X) to which the class determination result X corresponding to this division result is input. Thus, an area division result enabling the value of the energy function E(X) to become minimum can be obtained by cutting the directed graph so that the summation of costs becomes minimum.

As explained so far, probabilities that each pixel belongs to respective areas are calculated based on the color feature data of each pixel included in the intraluminal image, a weighted is provided to a detected edge depending on the color feature data (hue), and an edge corresponding to the residue border is emphasized in the first embodiment. Therefore, it is possible to reduce an influence of an edge detected other than the residue border (a groove in a mucus membrane area and the like, for example). Thus, it becomes possible to suppress a degradation of a performance in detecting a residue border and to divide an intralumianl image into a residue area and a mucus membrane area accurately.

While the first embodiment is configured to use $\{-\ln(P_u(X_u))\}$ as a member of the first energy function E1(X), any other functions (reciprocal and the like) may be used as long as the function is a decreasing function whose variable is the probability $P_u(X_u)$. Besides, while the first embodiment is configured to use $\exp\{-\text{Edge}(u, v)\}$ as a member of the second energy function E2(X), any other functions (reciprocal, negative logarithm, and the like) may be used as long as the function is a decreasing function whose variable is the weighted edge intensity Edge(u, v).

Modification

While the probability value calculator 16 uses the estimated distributions $D_{Res}$ and $D_{Mem}$ to calculate the probability $P_u(\text{Res})$ and the probability $P_u(\text{Mem})$ that each pixel belongs to the residue area 101 and the mucus membrane area 102 respectively at step S11, any methods other than this may be adopted as long as a probability based on color feature data can be obtained. For example, a data table in which pixel values (RGB values) or a hue value obtained via a conversion of the pixel values and the probabilities $P_u$(Res) and $P_u$(Mem) are associated may be recorded in the recording unit 14 in advance and the probabilities $P_u$(Res) and $P_u$(Mem) in each pixel in the intraluminal image 100 may be obtained by referring to the data table.

Second Embodiment

A second embodiment of the present invention will be explained next.

Figure 10:
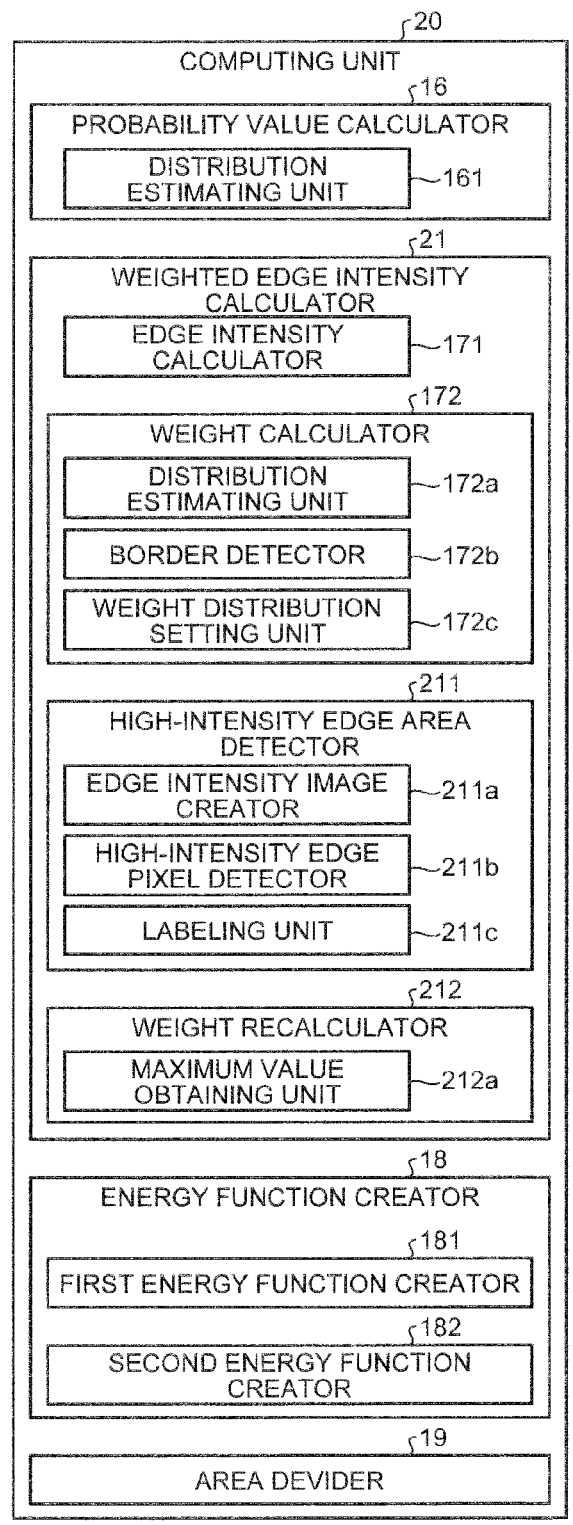
FIG. 10 is a block diagram of a configuration of a computing unit of an image processing apparatus according to a second embodiment of the present invention.

An image processing apparatus according to the second embodiment is provided with a computing unit 20 shown in FIG. 10 instead of the computing unit 15 shown in FIG. 1. The other configuration is the same as that shown in FIG. 1.

The computing unit 20 is provided with the probability value calculator 16, a weighted edge intensity calculator 21, the energy function creator 18, and the area divider 19. Among these components, the configuration and the operations of the probability value calculator 16, the energy function creator 18, and the area divider 19 are the same as those in the first embodiment.

The weighted edge intensity calculator 21 is further provided with a high-intensity edge area detector 211 and a weight recalculator 212 in addition to the edge intensity calculator 171 and the weight calculator 172. The configuration and the operations of the edge intensity calculator 171 and the weight calculator 172 are the same as those in the first embodiment.

The high-intensity edge area detector 211 detects a high-intensity edge area whose edge intensity is high based on values of pixels included in the intraluminal image 100. More specifically, the high-intensity edge area detector 211 is provided with an edge intensity image creator 211a that creates an edge intensity image based on an edge intensity between neighboring pixels; a high-intensity edge pixel detector 211b that detects a high-intensity edge pixel from the edge intensity image; and a labeling unit 211c that unites high-intensity edge pixels adjacent to each other to perform a labeling thereon, and detects the united high-intensity edge pixels as a high-intensity edge area.

The weight recalculator 212 recalculates a weight to be provided to the edge intensity between neighboring pixels in the high-intensity edge area with respect to the weight calculated by the weight calculator 172.

Figure 11:
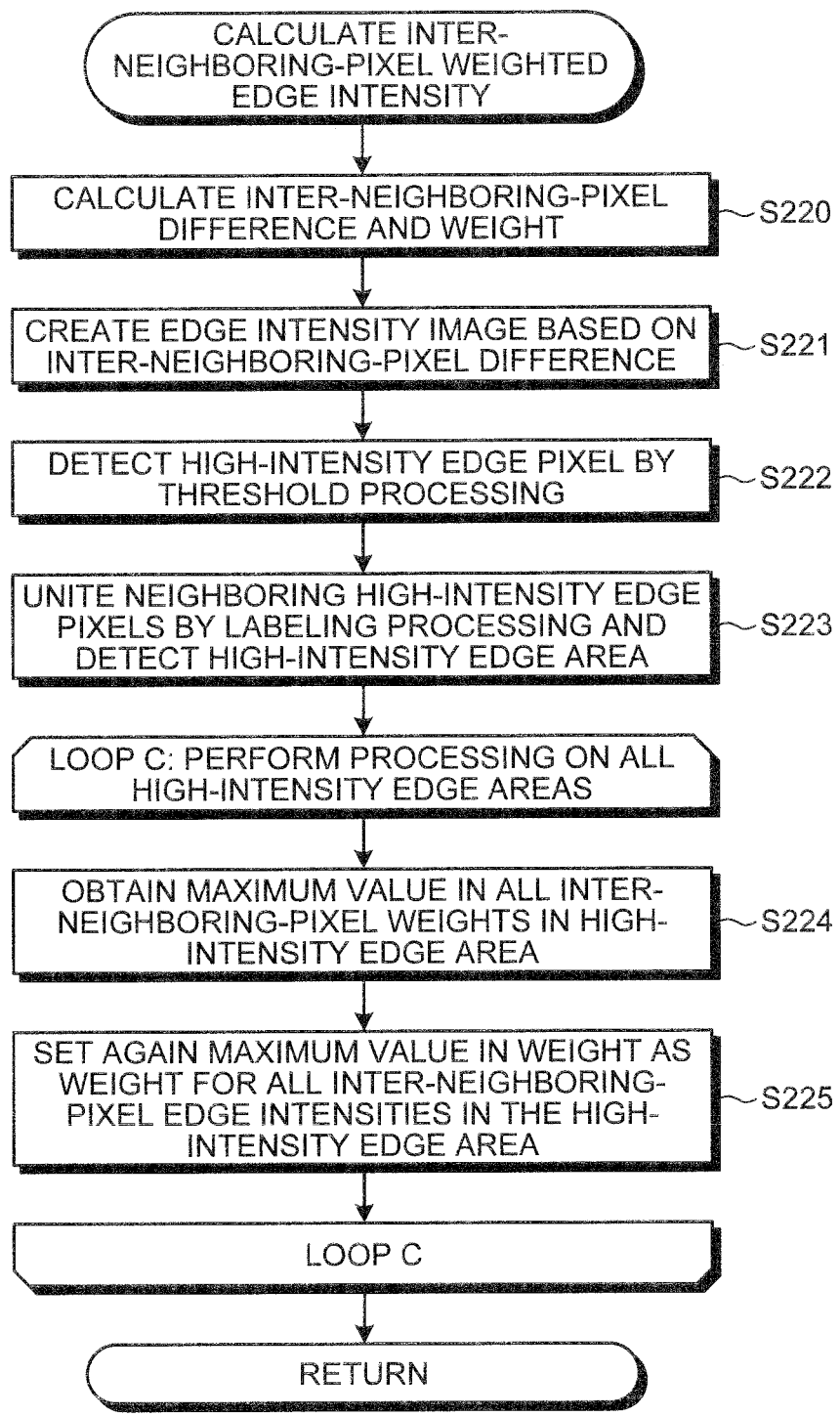
FIG. 11 is a flowchart of an operation of the computing unit shown in FIG. 10.

Next, an operation of the computing unit 20 will be explained. The operation of the computing unit 20 is the same as that shown in FIG. 2 as a whole and a content of a processing of calculating a weighted edge intensity between neighboring pixels at step S12 is different. FIG. 11 is a flowchart of the operation of the computing unit 20 at step S12. In the explanation below, a processing on an intraluminal image 110 shown in FIG. 12 will be taken as an example. The intralumianl image 110 includes a residue area 111 and a mucus membrane area 112. The intralumianl image 110 also captures a groove 114 in a mucus membrane in addition to a residue border 113.

First at step S220, the weighted edge intensity calculator 21 calculates a difference Diff(u, v) between neighboring pixels and a weight W(u, v) to be provided to the difference Diff(u, v). The operation at step S220 is equivalent to steps S120 to S125 shown in FIG. 6.

Figure 13:
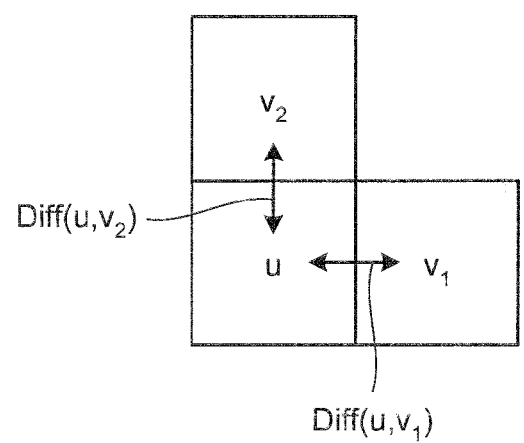
FIG. 13 is a view explaining how to create an edge intensity image.

At a subsequent step S221, the edge intensity image creator 211a creates an edge intensity image based on the difference Diff(u, v) between the pixel u and a neighboring pixel v in the intraluminal image 110. Specifically, the edge intensity image creator 211a calculates a difference Diff (u, $v_1$)

between the pixel u and a pixel $v_1$ locating at a right side of the pixel u and a difference Diff(u, $v_2$) between the pixel u and a pixel $v_2$ locating at an upper side of the pixel u as shown in FIG. 13, and further calculates an edge intensity I(u) which is obtained by following equation (8). An image in which a pixel value of the pixel u is the edge intensity I(u) is the edge intensity image.

$$I(u) = \sqrt{\text{Diff}(u,v_1)^2 + \text{Diff}(u,v_2)^2} \qquad (8)$$

Figure 14:
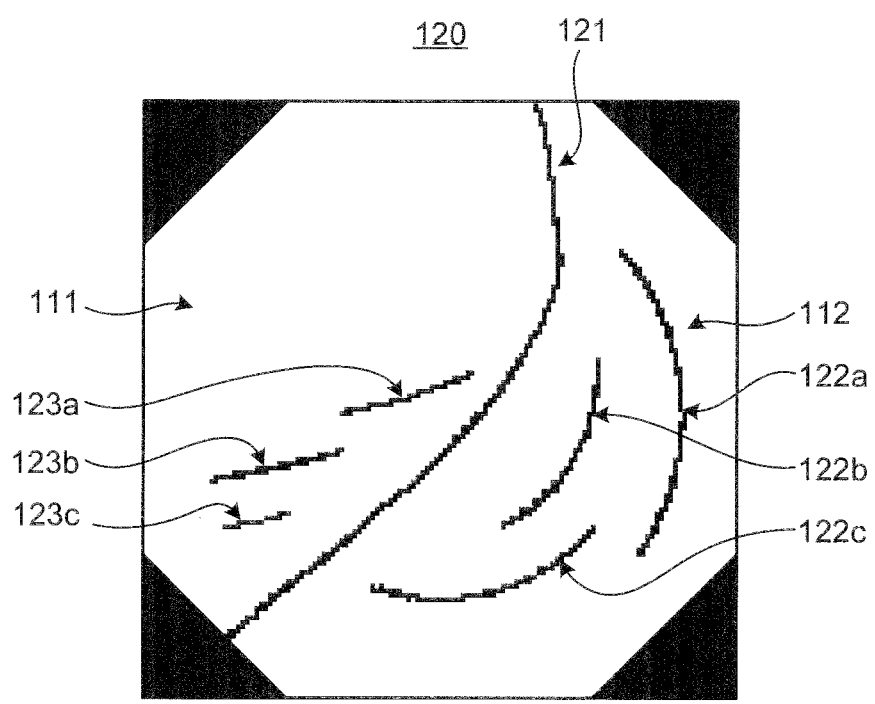
FIG. 14 schematically shows an image having high-intensity edge pixels.

At step S222, the high-intensity edge pixel detector 211b performs a threshold processing on the edge intensity image to detect a high-intensity edge pixel whose edge intensity is higher than a predetermined threshold. FIG. 14 shows an image having high-intensity edge pixels detected in this manner. In an image 120 having the high-intensity edge pixels, a high-intensity edge pixel group 121 is equivalent to the residue border 113 shown in FIG. 12 and high-intensity edge pixel groups 122a to 122c are equivalent to the groove 114 shown in FIG. 12. Besides, high-intensity edge pixel groups 123a to 123c attributed to a partial change in hue are detected in the residue area 111.

Next at step S223, the labeling unit 211c performs a labeling processing on the image 120 having high-intensity edge pixels and sets a high-intensity edge area by assigning the same label to the high-intensity edge pixels adjacent to each other. Specifically, labels different from each other are assigned to the high-intensity edge pixel groups 121, 122a to 122c, and 123a to 123c shown in FIG. 14. As a result of this, the high-intensity edge pixel groups 121, 122a to 122c, and 123a to 123c are each set as a high-intensity edge area.

Then, the weight recalculator 212 executes a process of a loop C on each of the high-intensity edge areas. First at step S224, a maximum value obtaining unit 212a obtains a weight $W_{MAX}$ which becomes maximum in the weights W(u, v) between neighboring pixels in each of the high-intensity edge areas in the intraluminal image 110.

At subsequent step S225, the weight recalculator 212 sets again the maximum value in weight $W_{MAX}$ as a weight to be provided to all the inter-neighboring-pixel edge intensities in each of the high-intensity edge areas.

Figure 12:
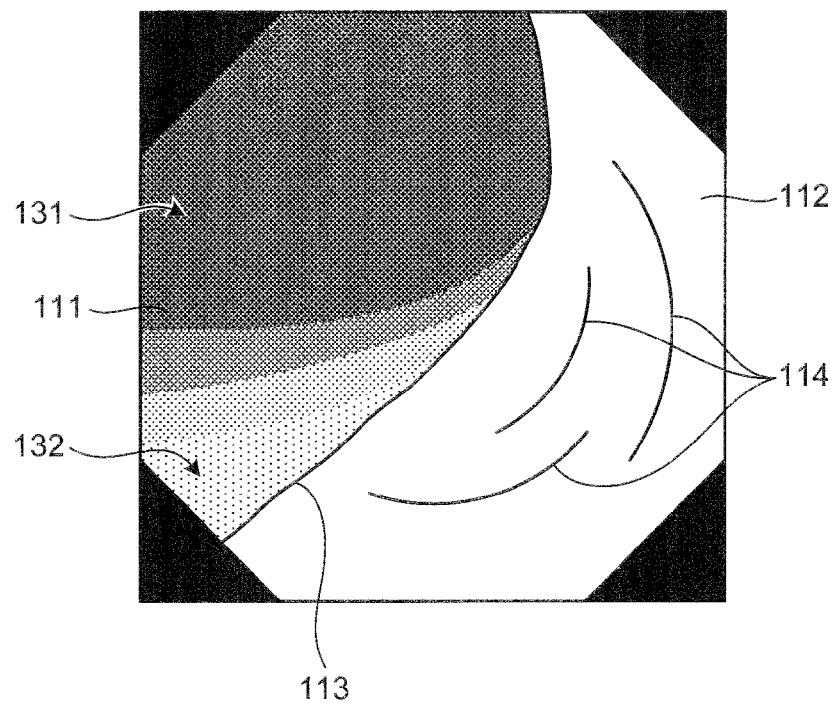
FIG. 12 schematically shows an example of an intraluminal image as an image processing target.

Here, the reason why the weight is set again in this manner will be explained. In the case where there is a change in hue in the residue area 111 as shown in FIG. 12, a weight to be provided to an edge intensity is set to be high with respect to pixels locating at a border position of an area (an area 131, for example) whose hue is close to $H_{BOR}$ pixels at an upper side in the high-intensity edge pixel group 121 shown in FIG. 14 and the high-intensity edge pixel group 123a, for example). The other way around, a weight to be provided to an edge intensity is set to be small with respect to pixels locating at a border position of an area (an area 132, for example) whose hue is distant from $H_{BOR}$ (pixels at a lower side in the high-intensity edge pixel group 121, for example). In this case, there is a possibility that an area corresponding to the pixels at the lower side of the high-intensity edge pixel group 121 is not recognized as a residue border and an area corresponding to the high-intensity edge pixel group 123a to which the weight is set to be high is instead detected as a residue border wrongly. In the second embodiment, a weight to be provided to an edge intensity is offset by focusing an attention on a continuity of the residue border 113 and uniformly setting the maximum value in weight $W_{MAX}$ with respect to pixels constituting the same coupled component.

After the weight recalculator 212 executes the processing of the loop C on all the high-intensity edge areas, the operation returns to the main routine. The weight W(u, v)(=$W_{MAX}$)

set again in this manner is used as a weight to be provided to the difference Diff(u, v) between neighboring pixels.

In the second embodiment explained above, an attention is focused on the continuity of edges of the residue border which needs to be detected, the detected high-intensity edge pixels are united via the labeling processing to set a high-intensity edge area, and a maximum value in weight in the high-intensity edge area is applied as a weight to be provided to edge intensities of the other neighboring pixels in the same high-intensity edge area. Thus, it becomes possible to reduce an influence of an edge detected other than the residue border and divide an intraluminal image into a mucus membrane area and a residue area accurately.

As explained above, since probabilities that each pixel belongs to respective areas are calculated based on color feature data of each pixel included in an image and a weight is provided to an inter-neighboring-pixel edge intensity based on the color feature data of each pixel to emphasize an edge corresponding to a contour of an area as a division target according to the first and the second embodiments and the modification, it becomes possible to reduce an influence of an edge in other than the target area and suppress a degradation of a performance in detecting a border.

While the case of dividing an intraluminal image into a residue area and a mucus membrane area is explained so far, a kind of images and an area as a detection target are not limited to the first and the second embodiments and the modification and it is possible to perform an area division as long as the area includes a difference in a feature of color information.

Besides, the present invention can be applied to a case of dividing an image into three or more areas. In a case where there is a definite difference in a feature of color information among a plurality of detection targets, for example, probabilities that each pixel belongs to respective areas and a weight to be provided to an edge intensity are calculated based on color feature data of respective detection targets to deal with a minimization problem with multiple values (reference: Yasushi Yagi, et al., *Computer vision leading edge guide* 1, pp. 54-59, Advanced Communication Media Co., Ltd., for example). Alternatively, the area division into two areas explained in the first and the second embodiments may be performed repetitively by changing parameters of color feature data to perform the division into three or more areas.

Moreover, while hue is used as color feature data in the first and the second embodiments and the modification, other color feature data (color saturation, luminosity, color difference, and the like) may be used.

The image processing apparatus according to the first and the second embodiments and the modification described above can be realized by having a computer system such as a personal computer and a workstation execute an image processing program recorded in a recording device. The computer system may be used by connecting devices including another computer system, a server, and the like via public lines such as a local area network (LAN), a wide area network (WAN), or the Internet. In this case, the image processing apparatus according to the first and the second embodiments and the modification may obtain image data of intraluminal images via these networks, output a result of an image processing to an output device of various kinds (a viewer, a printer, and the like) connected via these networks, and store the result of the image processing in a storage device (a recording device, a recording-device-dedicated reader, and the like) connected via these networks.

The present invention is not limited to the first and the second embodiments and the modification and various inventions may be formed by arbitrarily combining a plurality of constituents disclosed in the embodiments and the modification. For example, some constituents may be eliminated among all the constituents shown in the embodiment and the modification or constituents separately shown in different embodiments and modification may be arbitrarily combined to form an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for processing a plurality of pixels of an image, the image being of an object comprising a first area and a second area sharing a border with the first area, the image processing apparatus comprising:
  a processor comprising hardware, the processor being configured to implement:
    a probability value calculator configured to calculate, based on color feature data of the plurality of pixels:
      a probability that a target pixel of the plurality of pixels corresponds to the first area; and
      a probability that the target pixel corresponds to the second area;
    a weighted edge intensity calculator configured to calculate:
      an edge intensity based on:
        a pixel value of the target pixel; and
        a pixel value of a neighboring pixel of the target pixel;
      a weight distribution having a maximum value at a color feature data border in a color feature data space, wherein the color feature data border corresponds to a frequency where a color feature data distribution corresponding to the first area becomes comparable to a color feature data distribution corresponding to the second area;
      a weight based on the weight distribution, wherein the weight corresponds to a color feature data of the target pixel and a color feature data of the neighboring pixel; and
      a weighted edge intensity by applying the weight to the edge intensity;
    an energy function creator configured to create an energy function based on:
      the probability that the target pixel corresponds to the first area;
      the probability that the target pixel corresponds to the second area; and
      the weighted edge intensity; and
    an area divider configured to calculate an area determination result based on optimization of the energy function, wherein the area determination result indicates whether the target pixel corresponds to the first area or the second area.

2. The image processing apparatus according to claim 1, wherein the probability value calculator includes a distribution estimating unit configured to calculate:
  a first distribution of a color feature data of a pixel of the plurality of pixel estimated to correspond to the first area;

a second distribution of a color feature data of a pixel of the plurality of pixel estimated to correspond to the second area;

the probability that the target pixel of the plurality of pixels corresponds to the first area based on the first distribution; and the probability that the target pixel of the plurality of pixels corresponds to the second area based on the first distribution and the second distribution.

3. The image processing apparatus according to claim 2, wherein the distribution estimating unit is configured to calculate:

a total distribution of the color feature data of the plurality of pixels; and the first distribution and the second distribution by applying a mixed normal distribution to the total distribution.

4. The image processing apparatus according to claim 1, wherein the weighted edge intensity calculator is configured to:

create a weight function based on the weight distribution; and calculates the weight by using the weight function.

5. The image processing apparatus according to claim 4, wherein the weight calculator comprises:

a distribution estimating unit configured to estimate, based on the color feature data of the plurality of pixels:

the color feature data distribution corresponding to the first area; and the color feature data distribution corresponding to the second area;

a border detector configured to detect the color feature data border; and a weight distribution setting unit configured to set the weight distribution in which a value becomes maximum at the color feature data border, wherein a function corresponding to the weight distribution is treated as the weight function.

6. The image processing apparatus according to claim 5, wherein the weight distribution setting unit is configured to set, as the weight distribution, a normal distribution whose average is the color feature data border.

7. The image processing apparatus according to claim 5, wherein the weight distribution setting unit is configured to set, as the weight distribution, a distribution which is asymmetric with respect to the color feature data border.

8. The image processing apparatus according to claim 1, wherein the weighted edge intensity calculator is configured to calculate the weight based on a data table which corresponds to the weight distribution.

9. The image processing apparatus according to claim 1, wherein the weighted edge intensity calculator further comprises:

a high-intensity edge area detector configured to:
detect that the edge intensity of the target pixel is higher than a predetermined threshold;
determine that the target pixel is one of a plurality of pixels of a high-intensity edge area; and a weight recalculator configured to recalculate a weight to be applied to the edge intensity of the plurality of pixels of the high-intensity edge area.

10. The image processing apparatus according to claim 9, wherein the high-intensity edge area detector comprises:

an edge intensity image creator configured to create an edge intensity image based on the edge intensity between the target pixel and the neighboring pixel;

a high-intensity edge pixel detector configured to detect, from the edge intensity image, that the target pixel is one of the plurality of pixels of the high-intensity edge area; and a labeling unit configured to label the plurality of pixels of the high-intensity edge area.

11. The image processing apparatus according to claim 9, wherein the weight recalculator is configured to:

determine a maximum value among weights to be applied to the edge intensity of the pixels of the high-intensity edge area, and treat the maximum value as a weight to be applied to edge intensities of the plurality of pixels of the high-intensity edge area.

12. The image processing apparatus according to claim 1, wherein the area divider is configured to optimize the energy function by minimizing the energy function.

13. The image processing apparatus according to claim 1, wherein the energy function creator comprises:

a first energy function creator configured to create a first energy function whose result becomes smaller as a number of pixels corresponding to a more probable area among the first area and the second area is larger; and a second energy function creator configured to create a second energy function whose result becomes smaller as the weighted edge intensity between the target pixel and the neighboring pixel in which the border of the first area and the second area is determined to be present is higher.

14. The image processing apparatus according to claim 1, wherein the color feature data is a hue.

15. The image processing apparatus according to claim 1, wherein the image is an intraluminal image of an inside of a subject, wherein the first area is a residue area, and wherein the second area is a mucous membrane area comprising a groove.

16. An image processing method for processing a plurality of pixels of an image, the image being of an object comprising a first area and a second area sharing a border with the first area, the image processing method comprising:

calculating, by a probability value calculator implemented by a processing comprising hardware, based on color feature data of the plurality of pixels:

a probability that a target pixel of the plurality of pixels corresponds to the first area; and a probability that the target pixel corresponds to the second area;

calculating, by a weighted edge intensity calculator implemented by the processor:

an edge intensity based on:
a pixel value of the target pixel; and
a pixel value of a neighboring pixel of the target pixel;

a weight distribution having a maximum value at a color feature data border in a color feature data space, wherein the color feature data border corresponds to a frequency where a color feature data distribution corresponding to the first area becomes comparable to a color feature data distribution corresponding to the second area;

a weight based on the weight distribution, wherein the weight corresponds to a color feature data of the target pixel and a color feature data of the neighboring pixel; and a weighted edge intensity by applying the weight to the edge intensity;

creating, by an energy function creator implemented by the processor, an energy function based on:
   the probability that the target pixel corresponds to the first area;
   the probability that the target pixel corresponds to the second area; and
   the weighted edge intensity; and
calculating, by an area divider, an area determination result based on optimization of the energy function, wherein the area determination result indicates whether the target pixel corresponds to the first area or the second area.

17. A non-transitory computer-readable recording device in which an executable program is recorded, the program instructing a processor for processing a plurality of pixels of an image, the image being of an object comprising a first area and a second area sharing a border with the first area, to execute:
   calculating, based on color feature data of the plurality of pixels:
      a probability that a target pixel of the plurality of pixels corresponds to the first area; and
      a probability that the target pixel corresponds to the second area;
   calculating:
      an edge intensity based on:
         a pixel value of the target pixel; and
         a pixel value of a neighboring pixel of the target pixel;
      a weight distribution having a maximum value at a color feature data border in a color feature data space, wherein the color feature data border corresponds to a frequency where a color feature data distribution corresponding to the first area becomes comparable to a color feature data distribution corresponding to the second area;
      a weight based on the weight distribution, wherein the weight corresponds to a color feature data of the target pixel and a color feature data of the neighboring pixel; and
      a weighted edge intensity by applying the weight to the edge intensity;
   creating an energy function based on:
      the probability that the target pixel corresponds to the first area;
      the probability that the target pixel corresponds to the second area; and
      the weighted edge intensity; and
   calculate an area determination result based on optimization of the energy function, wherein the area determination result indicates whether the target pixel corresponds to the first area or the second area.

* * * * *